United States Patent
Le et al.

(10) Patent No.: US 6,230,005 B1
(45) Date of Patent: May 8, 2001

(54) METHOD AND APPARATUS FOR PROVIDING OVERLAY TO SUPPORT THIRD GENERATION CELLULAR SERVICES

(75) Inventors: Khiem Le, Coppell; Liangchi (Alan) Hsu, Arlington, both of TX (US); Atte Länsisalmi, Espoo (FI)

(73) Assignee: Nokia Telecommunications, Oy, Espoo (FI)

(*) Notice: Subject to any disclaimer, the term of this patent is extended or adjusted under 35 U.S.C. 154(b) by 0 days.

(21) Appl. No.: 09/164,554

(22) Filed: Oct. 1, 1998

(51) Int. Cl.$^7$ ..................................... H04M 3/42
(52) U.S. Cl. ............................ 455/414; 455/436
(58) Field of Search .................... 455/422, 433, 455/426, 414, 560, 561, 436; 370/338, 335, 401, 465, 466

(56) References Cited

U.S. PATENT DOCUMENTS

| | | | |
|---|---|---|---|
| 5,920,815 | * 7/1999 | Akhavan | 455/426 |
| 5,974,133 | * 10/1999 | Fleischer, III et al. | 379/320 |
| 6,005,926 | * 12/1999 | Mashinsky | 379/114 |
| 6,011,789 | * 1/2000 | Schilling | 370/342 |
| 6,072,778 | * 6/2000 | Labedz et al. | 370/252 |

FOREIGN PATENT DOCUMENTS

WO 98/32299  7/1998  (WO).

* cited by examiner

Primary Examiner—Vivian Chang
Assistant Examiner—N. Mehrpour (74) Attorney, Agent, or Firm—Altera Law Group, LLC (57) ABSTRACT

An overlay to an existing cellular switching structure to provide post-second generation services without the need to make modifications or updates to the existing infrastructure is disclosed. The overlay preserves second generation switching while providing post-second generation services. The overlay includes a post-second generation infrastructure for providing processing of post-second generation communication services, a first interface, coupled to the post-second generation infrastructure, for providing an access interface to a base station subsystem and processing base station subsystem signaling based upon a type of service and a type of call flow associated with the received signaling from the base station subsystem, and a second interface, coupled to the post-second generation infrastructure, for providing an inter-system interface to a signaling network and processing inter-system signaling between the signaling network, the first interface, the existing switching infrastructure and the post-second generation infrastructure. The first interface comprises an access interface manager, the access interface manager outputting access interface signaling based on base station subsystem signaling received from the base station subsystem according to a type of service and a type of call flow associated with the received base station subsystem signaling. The access interface manager further comprises a base station subsystem manager and a protocol interworking manager and the second interface includes an inter-system interface manager. The post-second generation infrastructure includes a general packet radio service system including a packet handoff manager, a serving general packet radio service support node, and a gateway general packet radio service support node.

25 Claims, 8 Drawing Sheets

METHOD AND APPARATUS FOR PROVIDING OVERLAY TO SUPPORT THIRD GENERATION CELLULAR SERVICES

BACKGROUND OF THE INVENTION

1. Field of the Invention

This invention relates in general to cellular communication systems, and more particularly to an overlay to an existing cellular switching structure to provide post-second generation services without the need to make modifications or updates to the existing infrastructure.

2. Description of Related Art

The demand by consumers all over the world for mobile communications continues to expand at a rapid pace and will continue to do so for at least the next decade. Over 100 million people were using a mobile service by the end of 1995, and that number is expected to grow to 300 million by the year 2000. Several factors are contributing to the exciting growth in the telecommunications industry. For example, a combination of technology and competition bring more value to consumers. Phones are smaller, lighter, had a longer battery life, and are affordable now for the mass market. Operators are providing excellent voice quality, innovative services, and roaming across the country or world. Most important, mobility is becoming less expensive for people to use. Around the world, as well as in the United States, governments are licensing additional spectrum for new operators to compete with traditional cellular operators. Competition brings innovation, new services, and lower prices for consumers.

For cellular telephony to continue its spectacular growth, it must handle more subscribers per base station and higher-bandwidth services. Toward that end, the industry's third technology generation (3G) is envisioned as a move beyond voice-only terminals to information communicators that will pass images and data.

Europe's Universal Mobile Telecommunications Standard (UMTS) is the follow-on to the second-generation Global System for Mobile communications (GSM) digital cellular standard. The Universal Mobile Telecommunications System (UMTS) is intended to provide a worldwide standard for personal mobile communications with the mass-market appeal and quality of wireline services. Over recent years, digital cellular technologies, such as GSM, have led the way towards personal communications, making mobile communications available to millions of users all around the world at reasonable cost. But to match the UMTS vision, a communications system must include support for flexible bearer and bandwidth-on-demand services for local (indoor) environments and for wide area coverage; a variety of mixed traffic types and relevant charging capability for mobile multimedia applications; customized services, service creation environments and service flexibility using, for example, intelligent network (IN) tools; and wideband wireless local loop (WLL) enhancement to the fixed network.

However, the wireless market in the United States is not as settled. For example, there are efforts to pursue a third-generation mobile standard based on the CDMA-One air interface.

Accordingly, any post-second generation air interface, e.g., a post-second generation (3G) air interface, must provide high speed packet data and second generation services as a subset of the post-second generation services. Herein post-second generation will be used to referred to any type of entity that is developed and implemented after the second generation entities.

As operators are forced to implement post-second generation infrastructure, second generation switching infrastructure must be modified or replaced to support the new services such as high speed packet data. Still, the framework of the existing infrastructure may not be optimal for support of post-second generation services, and practically, the operator may have to stay with the same switch supplier.

It can be seen that there is a need for a method and system that preserves second generation switching while providing post-second generation services.

It can also be seen that there is a need for an overlay to existing switching infrastructure to provide post-second generation services without requiring modifications or updating to the existing infrastructure.

SUMMARY OF THE INVENTION

To overcome the limitations in the prior art described above, and to overcome other limitations that will become apparent upon reading and understanding the present specification, the present invention discloses an overlay to an existing cellular switching structure to provide post-second generation services without the need to make modifications or updates to the existing infrastructure.

The present invention solves the above-described problems by providing a method and system that preserves second generation switching while providing post-second generation services.

A system in accordance with the principles of the present invention includes a post-second generation infrastructure for providing processing of post-second generation communication services, a first interface manager, coupled to the post-second generation infrastructure, for providing an access interface to a base station subsystem and processing base station subsystem signaling based upon a type of service and a type of call flow associated with the received signaling from the base station subsystem, and a second interface manager, coupled to the post-second generation infrastructure, for providing an inter-system interface to a signaling network and processing inter-system signaling between the signaling network, the first interface manager, the existing switching infrastructure and the post-second generation infrastructure.

Other embodiments of a system in accordance with the principles of the invention may include alternative or optional additional aspects. One such aspect of the present invention is that the first interface manager comprises an access interface manager, the access interface manager outputting access interface signaling based on base station subsystem signaling received from the base station subsystem according to a type of service and a type of call flow associated with the received base station subsystem signaling.

Another aspect of the present invention is that the access interface manager further comprises a base station subsystem manager and a protocol interworking manager.

Another aspect of the present invention is that the second interface manager further comprises an inter-system interface manager.

Yet another aspect of the present invention is that the post-second generation infrastructure further comprises a general packet radio service system including a packet handoff manager and a serving general packet radio service support node.

Another aspect of the present invention is that the post-second generation infrastructure further comprises a gateway general packet radio service support node coupled to the serving general packet radio service support node.

Another aspect of the present invention is that the inter-system signaling comprises access interface signaling for the access interface manager, post-second generation signaling for the post-second generation switching infrastructure, existing switch signaling for the existing switching infrastructure, and signaling network signaling for the signaling network.

Another aspect of the present invention is that the existing switching infrastructure comprises a mobile switching center and a visitor location register.

Still another aspect of the present invention is that the existing switching infrastructure further comprises a home location register coupled to the second interface.

Another aspect of the present invention is that the home location register provides administrative information and the current location of each registered subscriber accessing the existing switching infrastructure in the network.

Another aspect of the present invention is that the call flows comprise, among others, registration signal flows, mobile origination call flows and hard handoff signal flows.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a signaling scheme that includes an overlay to an existing switching infrastructure to provide post-second generation services, without requiring modifications or updating to the existing infrastructure. The overlay scheme according to the present invention involves two primary concepts. The first concept is to combine/split the signaling to/from other switches and to/from the Base Station. The second concept is for the overlay to intercept the signaling between the existing switch and the Base Station, and between the existing switch and the other switches. For clarity purposes only, the present invention will be described with reference to the use of the second generation (2G) IS-95 CDMA air interface as the existing switching infrastructure. However, those skilled in the art will recognize that the present invention is not meant to be limited to a particular existing infrastructure, but preserves the investment in the existing switching infrastructure by continuing to use it for existing services. Furthermore, the overlay can be independently optimized for new services, and does not require a change in the existing second generation infrastructure.

Figure 1:
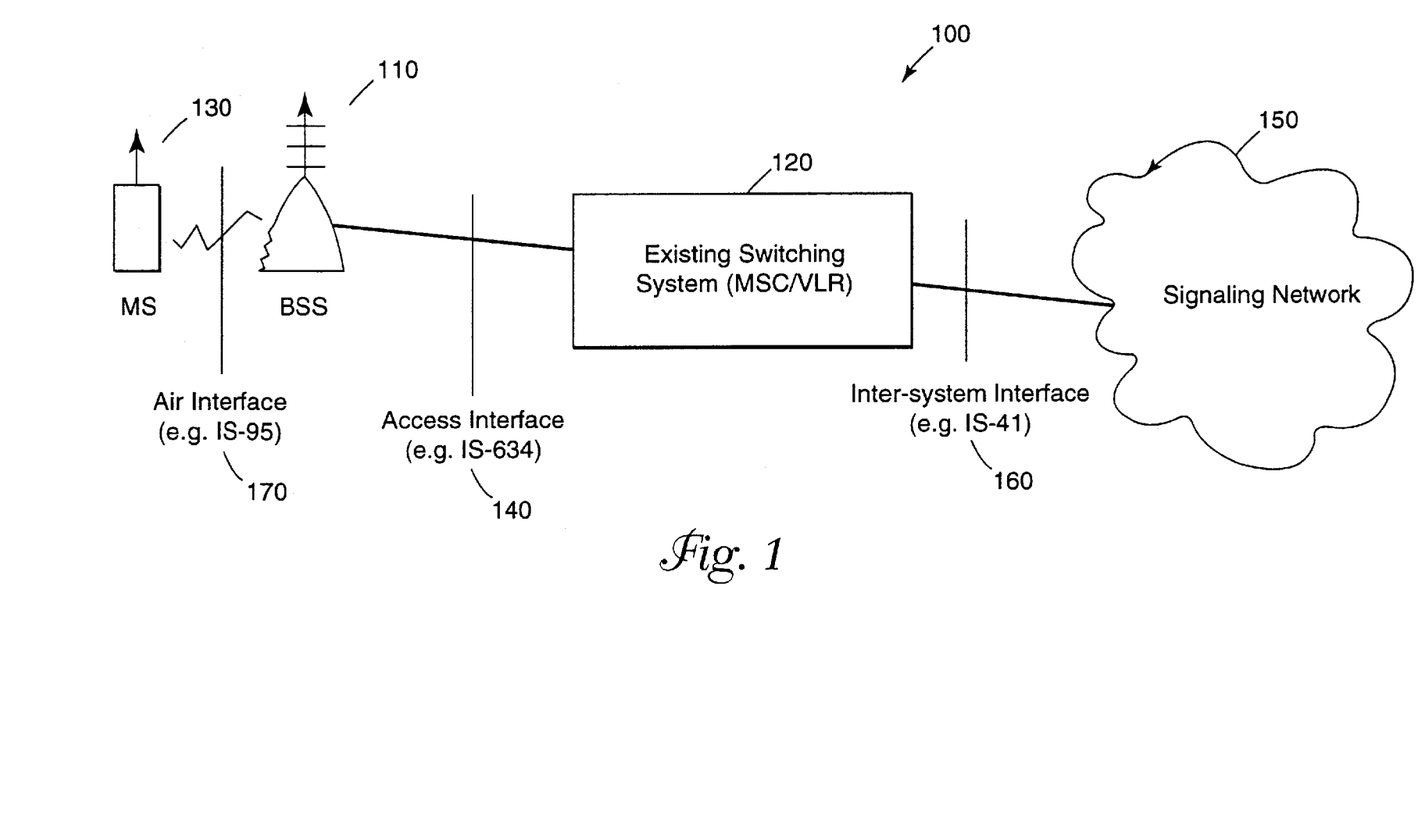
FIG. 1 shows an existing second generation cellular architecture.

FIG. 1 shows an existing second generation cellular architecture 100. In FIG. 1, the existing second generation cellular structure includes a base station subsystem (BSS) 110 and the Mobile Switching Center/Visitor Location Register (MSC/VLR) 120. The central component of a network subsystem is the Mobile Switching Center (MSC). The MSC acts like a normal switching node of the Public Switched Telephone Network (PSTN) or Integrated Services Digital Network (ISDN), and additionally provides all the functionality needed to handle a mobile subscriber, such as registration, authentication, location updating, handovers/handoffs, and call routing to a roaming subscriber. The VLR contains selected administrative information from a Home Location Register (HLR), necessary for call control and provision of the subscribed services, for each mobile station (MS) 130 currently located in the geographical area controlled by the VLR. Although each functional entity can be implemented as an independent unit, manufacturers of switching equipment generally implement the VLR together with the MSC, so that the geographical area controlled by the MSC corresponds to that controlled by the VLR, thus simplifying the signaling required.

The switching system interacts with the rest of the world through two interfaces. First, the BSS 110 interacts with the MSC/VLR 120 via the Access Interface 140, e.g., IS-634. Next, the MSC/VLR 120 interacts with the Signaling Network 150 via an Inter-system Interface 160, e.g., IS-41. Finally, the MS 130 interacts with the BSS 110 via an air interface 170, e.g., IS-95.

Figure 2:
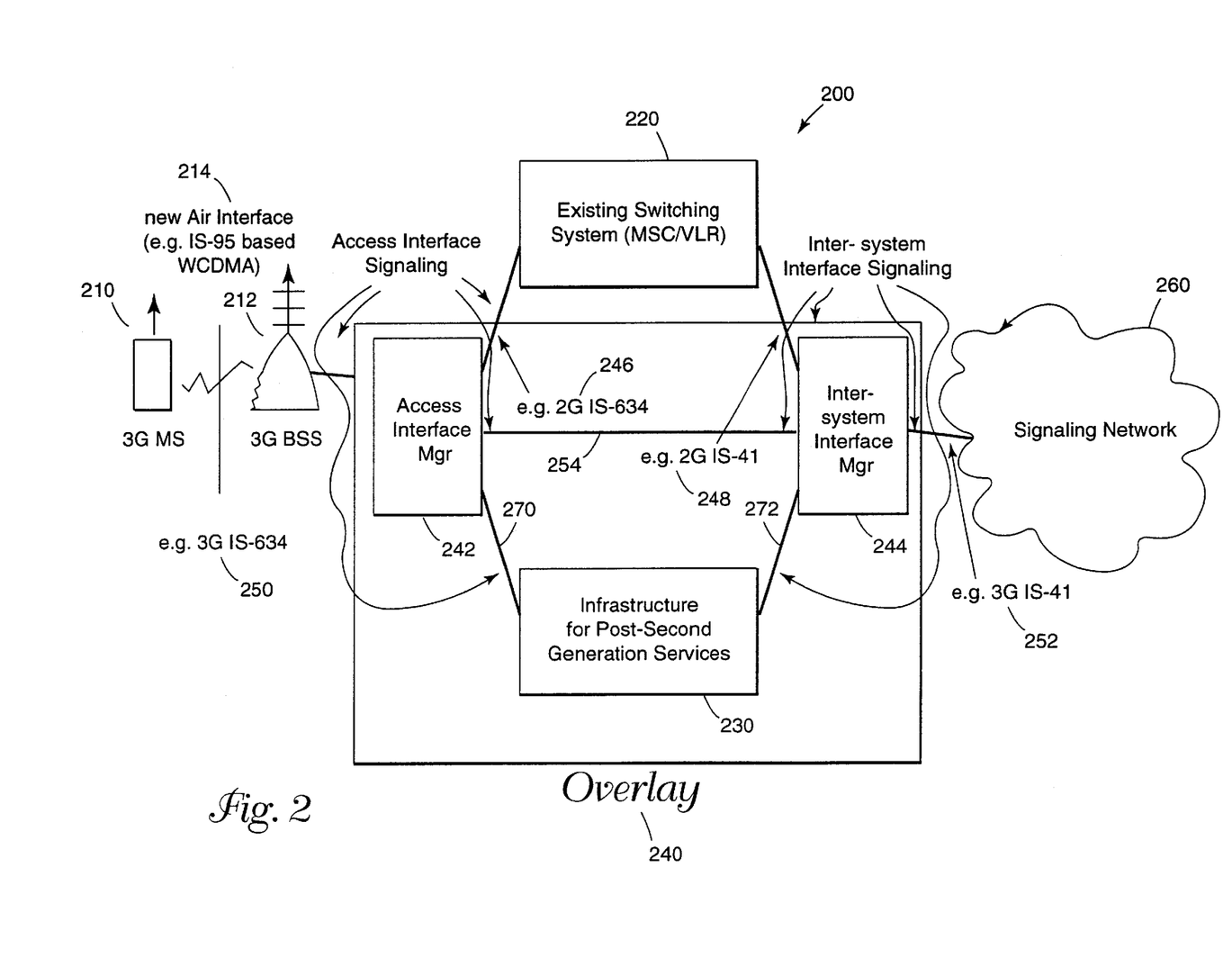
FIG. 2 shows the overview of the infrastructure and overlay according to the present invention.

FIG. 2 shows the overview of the infrastructure and overlay 200. The new mobile station (MS) 210 and new base station subsystem (BSS) 212 support the new post-second generation air interface 214. The existing infrastructure provides second generation services, while the post-second generation infrastructure 230 is designed to support new services in accordance with the new air interface 214. The second generation services could be speech or low speed data service and post-second generation services could be high speed data services or multimedia applications.

The present invention provides an overlay 240 that includes the post-second generation infrastructure 230 as shown in FIG. 2. Two Interface Managers 242, 244 provide functions to combine and split signaling to/from the new BSS 212 and signaling to/from other (switching) systems in the signaling network 260 respectively. By doing so, the existing system 220 is able to provide existing second generation services, which usually are a subset of post-second generation services provided by the post-second generation infrastructure 230. Furthermore, the post-second generation infrastructure 230 for new services can be independently optimized for post-second generation services without changing the existing system 220.

As mentioned above, this invention considers the case of second generation IS-95 CDMA for concreteness, but without loss of generality, although the ideas presented here are applicable to other cases. As IS-95 air interface evolves to a post-second generation interface, i.e. a 3G CDMA air interface, with high speed packet data as the main service driver, the infrastructure is expected to be impacted as follows. The radio base station (BS) infrastructure will likely have to be replaced by a new one (i.e. CDMA 3G BSS) 212, due to the extensive changes to the radio specifications. The switching infrastructure will also have to be modified to support high speed packet data, although a replacement is less likely. The present invention defines a scheme that enables the addition of an overlay 240 that is optimized for high speed packet data, without requiring changes to the second generation switching infrastructure 220. When it is available, a post-second generation radio base station infrastructure 230 with a standardized access interface can be connected to the second generation switching infrastructure through an Access Interface Manager 242. General Packet Radio Service (GPRS) infrastructure is used in this invention as an example of the post-second generation infrastructure for new services, i.e. GPRS is used to provide high speed packet data for post-second generation services. However, those skilled in the art will recognize that the concept embodied by the present invention can be applied to other systems.

FIG. 2 shows the addition of an overlay 240 on top of the existing switching infrastructure 220 to support post-second generation services. The overlay 240 includes an infrastructure for new services 230, and two interface managers: the Access Interface Manager (AIM) 242, and the Inter-system Interface Manager (IIM) 244. The interface managers 242, 244 perform the appropriate protocol conversions and interworking so that the existing switching infrastructure 220 does not have to be modified, and can still be used for second generation services, which are a subset of the post-second generation services. In particular, the existing switch 220 still sees a second generation access interface 246 and a second generation inter-system interface 248. The infrastructure investment is thus preserved. The post-second generation BSS 212 sees a post-second generation access interface 250. A standard post-second generation BSS 212 can thus be used. The other post-second generation systems from the signaling network 260 see a post-second generation inter-system interface 252 when they interact with the overlay system 240 and the existing infrastructure 220, thus enabling transparent interoperability. Finally, the protocol conversion/interworking done by the interface managers 242, 244 include two key features: signaling splitting/combining, and signaling interception. Accordingly, the AIM 242 and IIM 244 provide signaling to and from the existing switching system 220, the post-second generation infrastructure 230 and each other, i.e., via inter-manager signaling interface 254.

The AIM 242 provides access interface signaling including the signaling from the AIM 242 to the existing switching system 220 via the second generation access interface 246, signaling 270 from the AIM 242 to the post-second generation infrastructure 230 and inter-manager signaling from the AIM 242 to the IIM 244 via inter-manager interface 254. The IIM processes inter-system signaling including the inter-manager signaling via the inter-manager interface 254, post-second generation signaling 272 for the post-second generation switching infrastructure 230, existing switch signaling via second generation inter-system interface 248, and signaling network signaling for the signaling network via post-second generation inter-system interface 252.

The post-second generation infrastructure 250 for new services can be optimized for new services, independently of the second generation infrastructure 220. While, the existing CDMA system is only suitable for speech and low speed data services, i.e., 9.6 Kbps or 14.4 Kbps maximum, the post-second generation of CDMA is expected to offer high rate services, e.g., 384 Kbps, or very high rate services, e.g., 2 Mbps. Further, while the standardization process of air interface and network for the post-second generation is still underway, the standardization of General Packet Radio Service (GPRS) is almost finalized, and GPRS high speed packet data service is expected to be in service in the near future. Accordingly, the present invention may by applied to the case of overlaying CDMA system and GPRS systems to provide services of speech and high speed packet data in a more timely manner. Accordingly, the more specific explanation of an overlay 240 according to the present invention will be described with reference to a GPRS/CDMA system. Those skilled in the art will recognize that the present invention is not meant to be limited to a GPRS/CDMA system.

Figure 3:
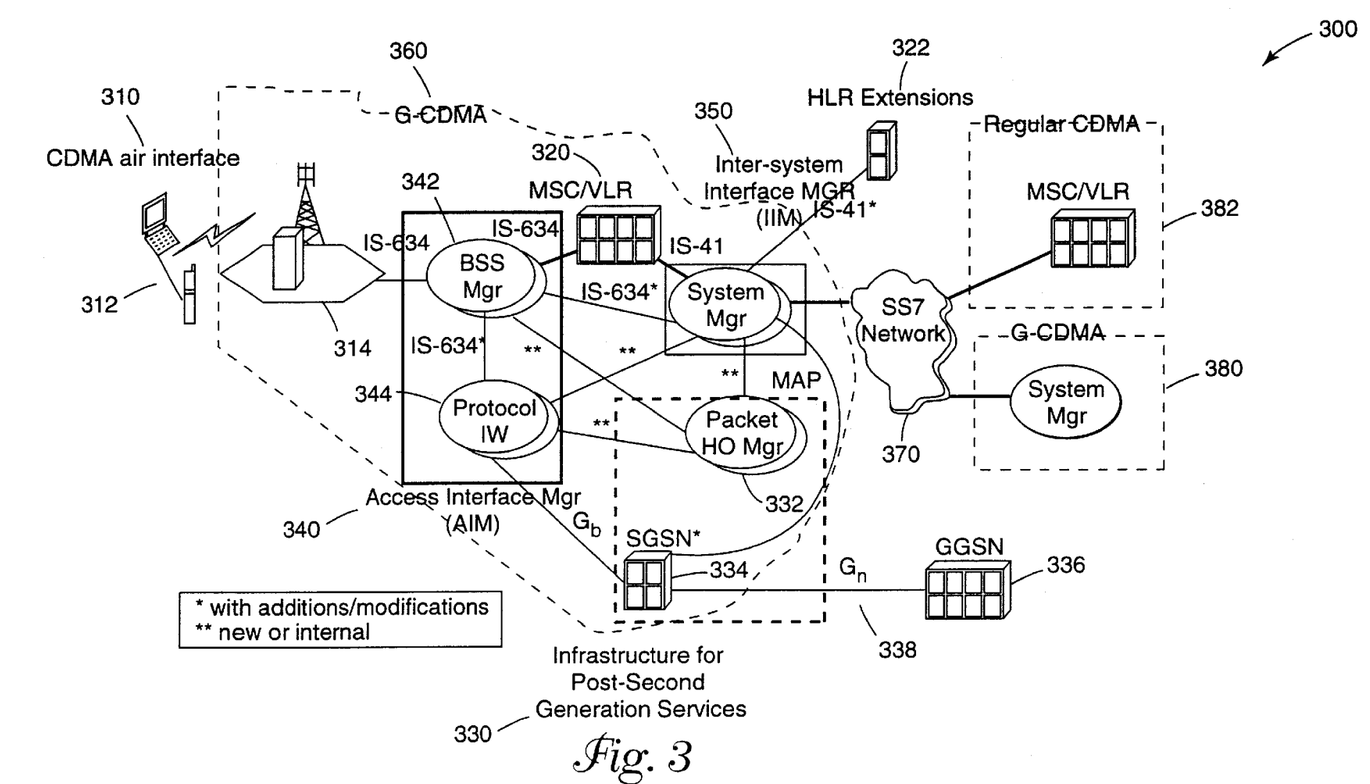
FIG. 3 illustrates a more detailed block diagram of an overlay system according to the present invention.

FIG. 3 illustrates a more detailed block diagram of an overlay system according to the present invention. In FIG. 3, the 3G CDMA air interface 310 is used between the MS 312 and BSS 314. The existing system includes MSC/VLR 320 and a HLR 382. The HLR 382 contains all the administrative information of each second generation registered subscriber accessing the existing switching infrastructure 320 in the network, along with the current location of a MS 312 requesting second generation mobile services. The post-second generation infrastructure 330 for new services contains a Packet Handoff (HO) Manager 332 and a Serving GPRS Support Node (SGSN) 334. A Gateway GPRS Support Node (GGSN) 336 is also provided for the GPRS. The Serving GPRS Support Node (SGSN) 334, which is at the same hierarchical level as the MSC 320, keeps track of the individual MS 312 location and performs security functions and access control for packet data services. The GGSN 336 provides interworking with external packet-switched networks, and is connected with SGSNs 334 via an IP-based GPRS backbone network 338.

The overlay includes functional entities of an Access Interface Manager (AIM) 340 including a BSS manager 342 and a Protocol Interworking (IW) 342, an Inter-System Interface Manager 350 including a System Manager 352, and a Packet Handoff (HO) Manager 332. In this example, the G-CDMA 360 is the system combining the new air interface 310, the existing infrastructure 320, the post-second generation infrastructure 330, and the above-mentioned components of the overlay system. The G-CDMA system 360 is connected to a Signaling System 7 (SS7) signaling network 370. The SS7 signaling network 370 is connected to other systems, such as other G-CDMA systems 380 or a regular, second generation CDMA system 382.

Figure 4:
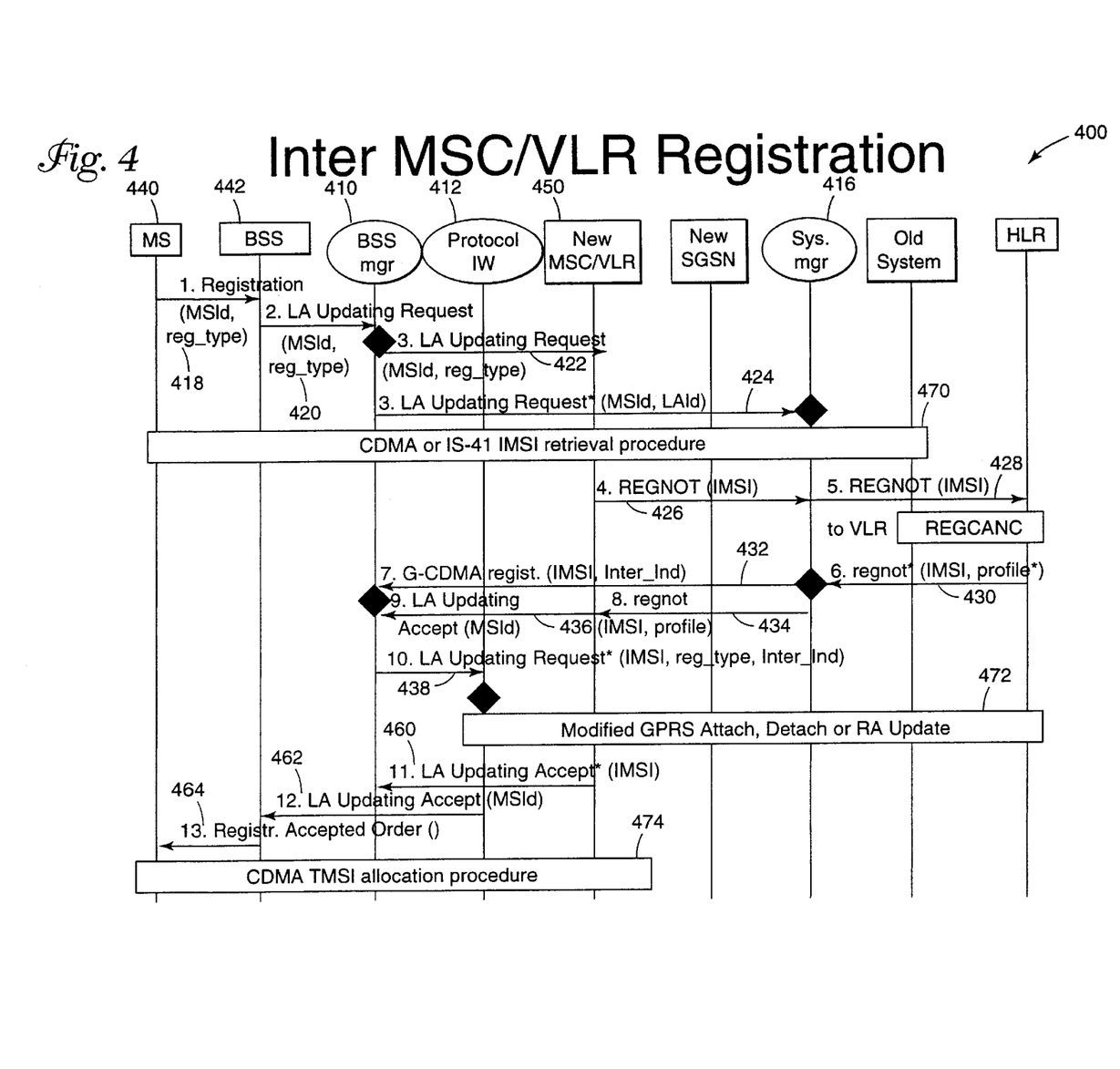
FIG. 4 illustrates inter-MSC/VLR Registration flow according to the present invention.
Figure 5:
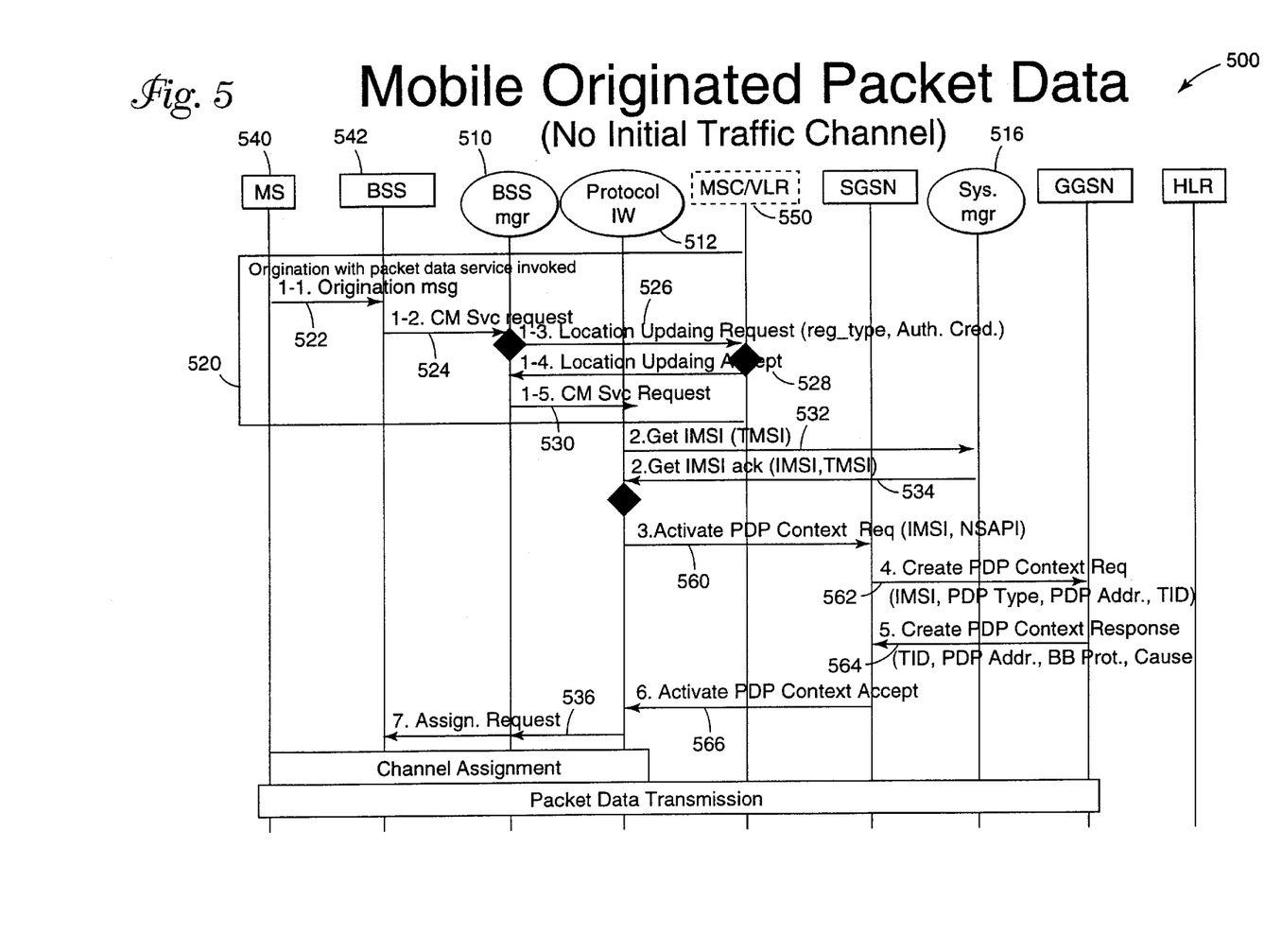
FIG. 5 illustrates the flow of a mobile originated packet data according to the present invention.
Figure 6:
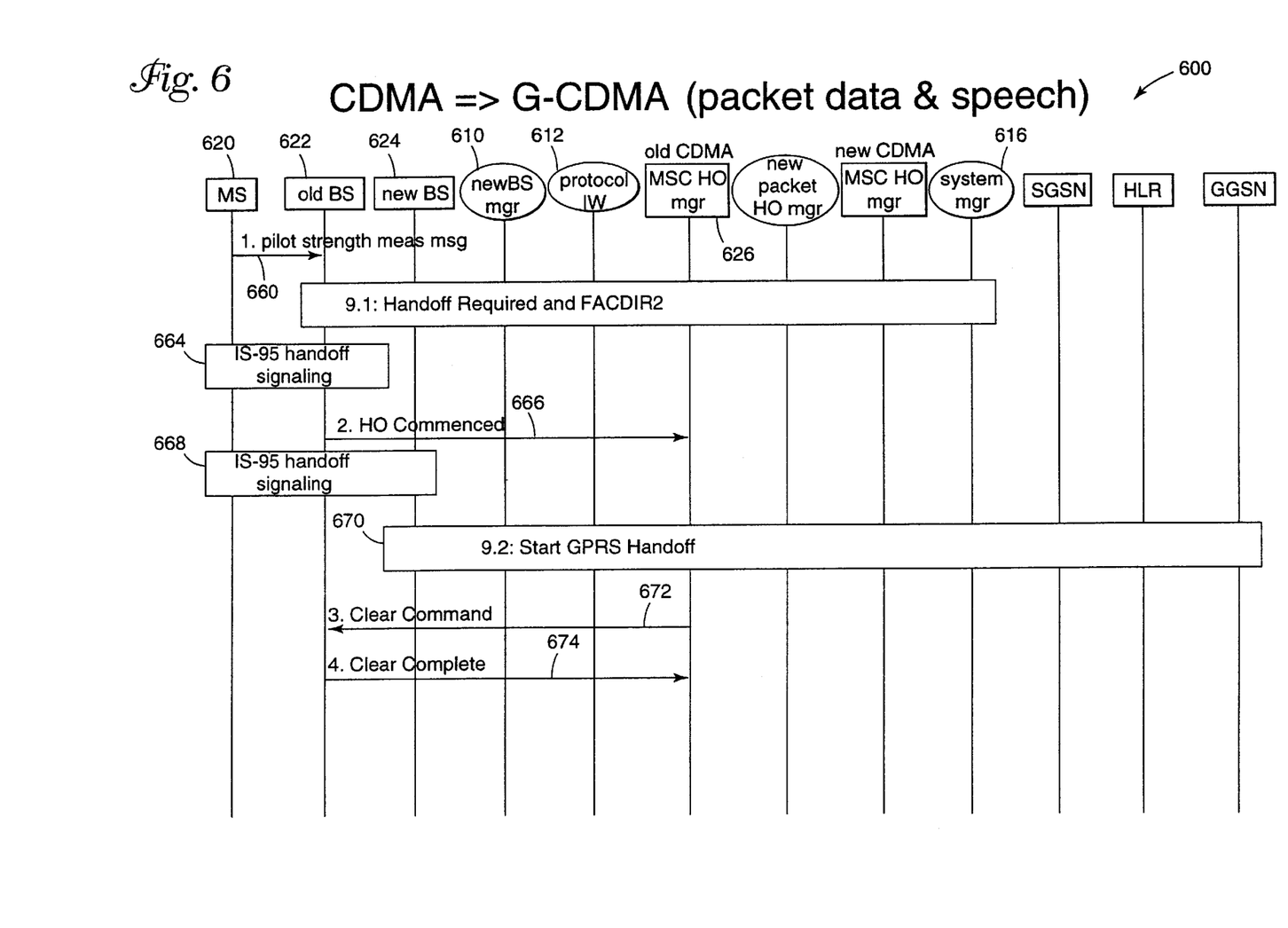
FIG. 6 illustrates the high level flow of a hard handoff according to the present invention.

The handling of call flows illustrates the operation, as well as the importance, of the present invention. The present invention may handle all call flows including but not limited to Registration, Mobile Origination Call, and Hard Handoff (speech and packet data). FIGS. 4–6 illustrates examples of call flows according to the present invention.

FIG. 4 illustrates inter-MSC/VLR Registration 400 according to the present invention. In FIG. 4, the access interface manager (AIM) is the BSS manager 410 and Protocol IW 412. The inter-system interface manager (IIM) is the system manager 416. At step 1 418, the MS 440 sends the Registration over the air interface to the BSS 442 indicating the type of registration. At step 2 420, the BSS 442 sends a corresponding access interface message to the BSS manager. At step 3, the BSS manager will routinely distribute a first access interface Registration message 422 (i.e., LA Updating Request) to the MSC/VLR 450 and a second access interface Registration message 424 (i.e., LA Updating Request) to the system manager 416. The message 424 to the system manager 416 will include the Location Area Identity (LAId) of the cell that the MS 440 is registering in. The BSS manager 410 will wait for a response from the system manager 416 to determine whether a GPRS procedure is needed. The system manager 416 will check whether it recognizes this MS 440 or not.

The system manager 416 combines messages 424 at step 3 and the Registration Notification (REGNOT) message at step 4 426 into the REGNOT message at step 5 428. If the MS 440 is not known, the inter-MSC/VLR Registration continues, and the system manager 416 waits to see the HLR updating via step 6 430 for this user. If MS 440 is not known to the MSC/VLR 450, and a Temporary Mobile Subscriber Identification (TMSI) was used as the Mobile Subscriber Identification (MSId), the IMSI is retrieved. If the MS is known, it is a case of intra-MSC/VLR registration.

In steps 4 426, 5 428, 6 430, and 8 434, the messages are regular IS-41 HLR updating and registration cancellation messages. In step 6 430, the message also carries the GPRS addition in the profile, if one exists, but the system manager 416 will remove the GPRS addition. Message 8 434 contains a pure IS-41 profile. In step 7 432, if the profile has GPRS addition, i.e., the MS is G-CDMA capable, the new G-CDMA registration message is sent to the BSS manager 410. The message in step 7 432 contains a new parameter called the inter_ind, which indicates whether the procedure is inter or intra-SGSN. The system manager 416 will indicate "inter SGSN" if the MS 440 is unknown, or known but the LAId indicates another SGSN. The system manager 416 will indicate "intra SGSN" for known MS 440 with LAId indicating the same SGSN. If the MS 440 does not have G-CDMA capability, the system manager sends G-CDMA registration (parameter=null) and steps 10 436 and 11 460 are omitted. Note that serving MS 440 with basic IS-707 packet data capability, but without G-CDMA specific capability is not provided by the present invention.

In step 9 436, Registration in the CDMA MSC/VLR 450 is accepted. For G-CDMA subscribers, as noted by the G-CDMA registration message in step 7 432, the BSS manager 410 will wait the acceptance of GPRS procedure at step 11 460 before relaying accept to the MS 440. For regular CDMA user the procedure continues from step 12 462.

In step 10 438, the Location Area Update (LAU) Request is sent to Protocol IW 412 to initiate the appropriate GPRS procedure. The Protocol IW 412 will look at the reg_type parameter to determine which procedure to launch. In step 11 460, when the GPRS procedure is successfully completed, a LA Updating Accept is sent to the BSS manager 410. In step 12 462, when the BSS manager 410 has received both LA Updating Accepts 436 and, if applicable, 640, the Accept is relayed to BSS 442. In step 13 464, the BSS 442 relays the accept on to the MS 440 and the new CDMA system will allocate a new TMSI to the MS.

FIG. 5 illustrates the process of a mobile origination call 500 according to the present invention. In FIG. 5, the access interface manager (AIM) is the BSS manager 510 and Protocol IW 512. The inter-system interface manager (IIM) is the system manager 516. In FIG. 5, Mobile Originated packet data call process is shown where there is no initial traffic channel available. The first block of messages 520 represents the packet data call origination. For ease of explanation, only major messages will be explained herein and all messages of Mobile Origination (MO) call are not shown. In step 1-1 522, the origination message with service option set to packet data is sent by the MS 540 to the BSS 542. In step 1-2 524, the CM Service Request is sent by the BSS 542 to the BSS manager 510. In step 1-3 526, the BSS manager 510 checks if the service option is packet data only. If so, optionally BSS manager 510 sends Location Updating Request (reg_type and Auth. Credentials) to MSC/VLR 550 at step 526. The purpose of this message is to use the MSC/VLR 550 to authenticate the MS 540. The SGSN 518 cannot do authentication, because it will cause a mismatch in the Call History Count. In step 1-4 528, the MSC/VLR 550 performs the Authentication procedure and returns Location Updating Accept message to the BSS manager 510. Finally, in step 1-5 530, the BSS 542 sends CM Service Request to Protocol IW 512.

In step 2, if the Origination included TMSI as the MSId, the Protocol IW 512 will request the IMSI of the MS 540 from the system manager 516 with newly defined Get IMSI 532 and Get IMSI Ack 534 messages. At this point the Protocol IW 512 has to determine if the Origination relates to an existing Packet Data Protocol (PDP) context, or if there is a need to create a new one. If an appropriate PDP context exists already, the procedure may continue from step 7 536. If PDP context needs to be activated, steps 3 560, step 4 562, step 5 564 and step 6 566 take place.

Steps 3.-6 560–566 illustrate a standard GPRS PDP Context activation procedure. A default PDP context is activated as there are no means for the MS 540 to specify the PDP contexts. It is possible to specify the use of the dialed digits as an indication of different types of default PDP contexts, and convert that to GPRS Network Service Access Point Interface (NSAPI) parameter in Protocol IW 512. Optionally the SGSN 518 may initiate the CDMA authentication procedure.

In step 7 536, the Protocol IW 512 sends an Assignment Request message to the BSS 542 through BSS manager 510. Then the "Channel Assignment" process is followed, which can be referred to IS-95 and IS-634.

Figure 7:
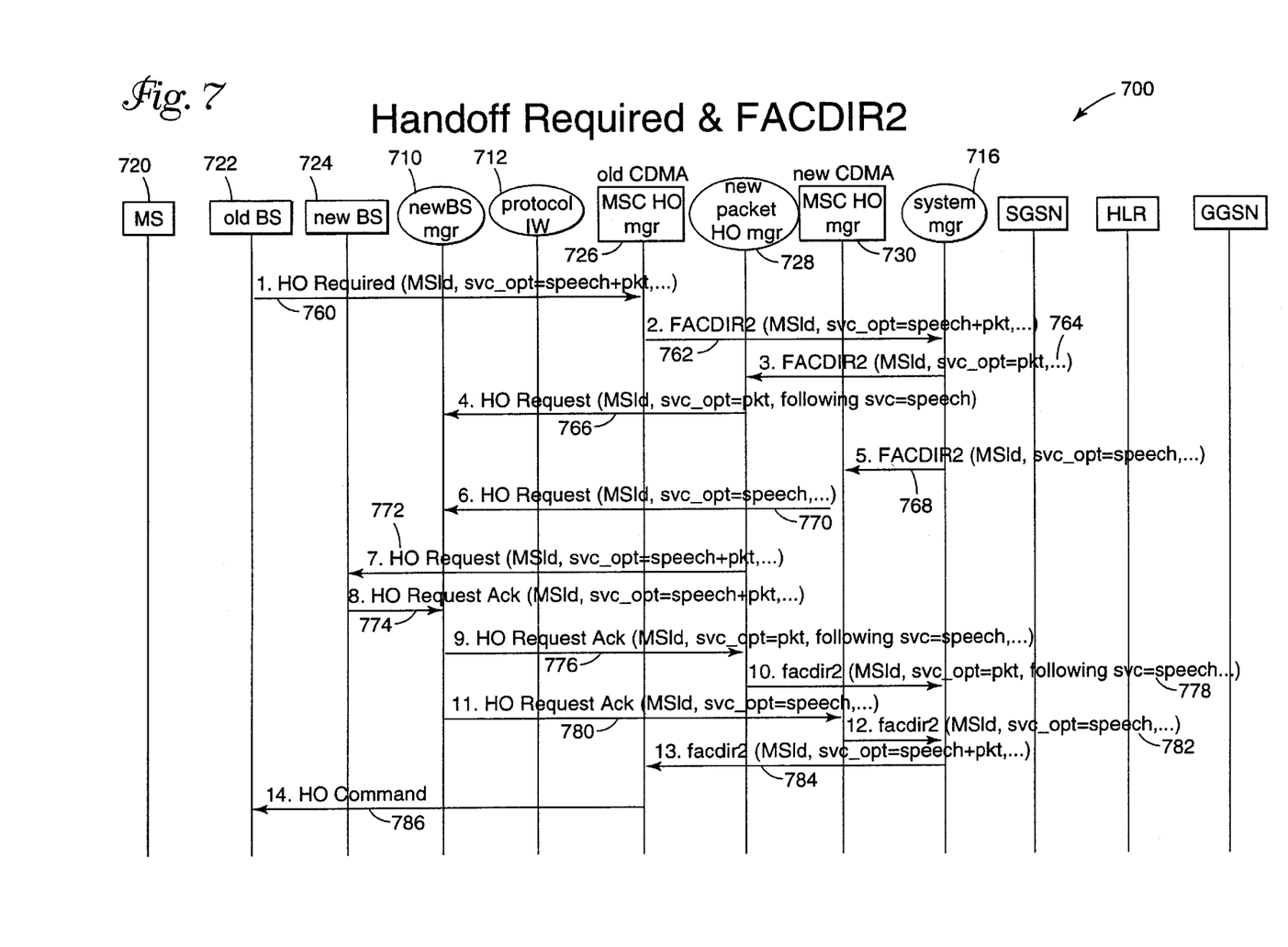
FIG. 7 illustrates the Handoff Required and FACDIR2 messaging which is used in FIG. 6 according to the present invention.
Figure 8:
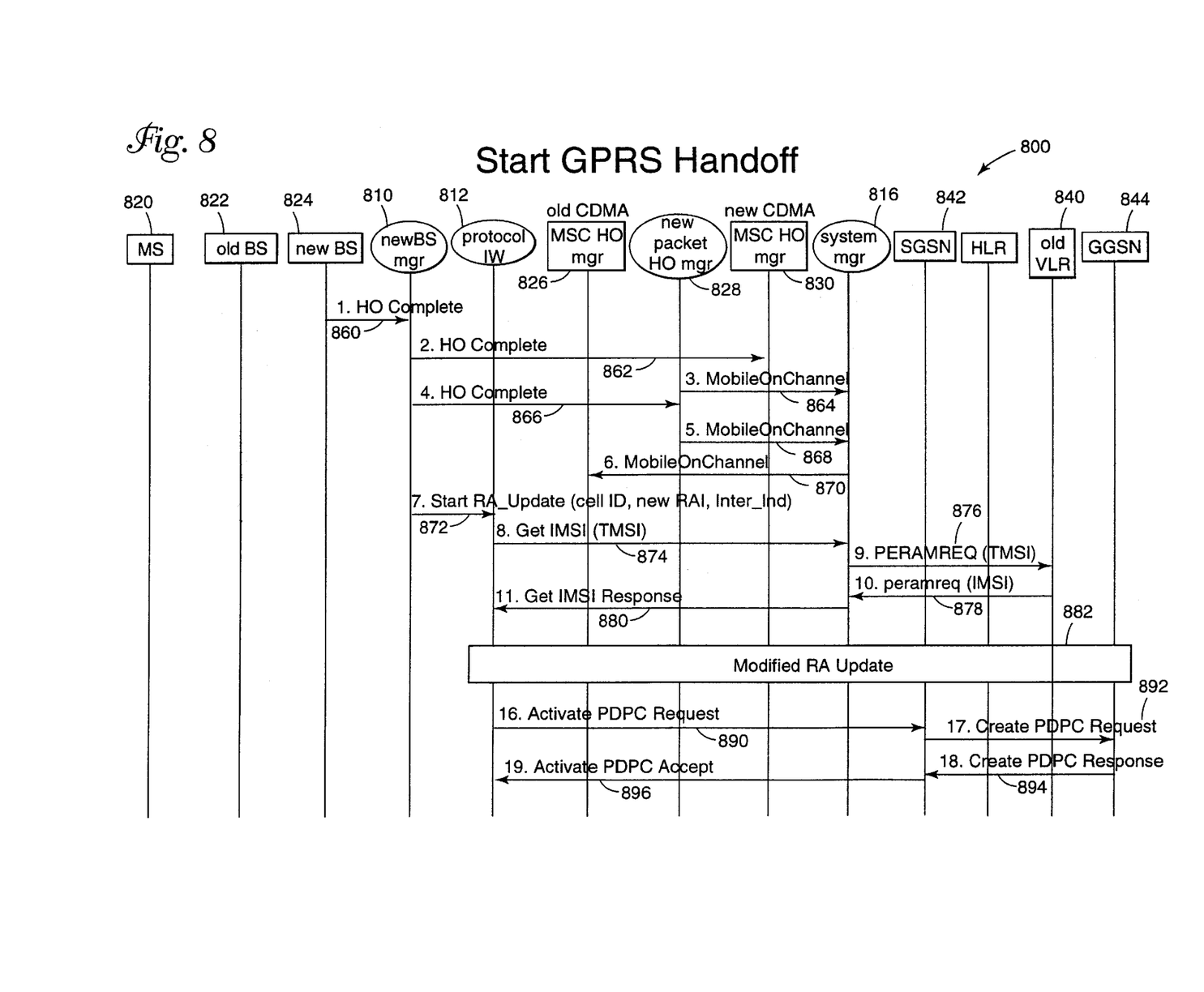
FIG. 8 illustrates the start of the GPRS handoff which is used in FIG. 6 according to the present invention.

FIGS. 6–8 illustrates a Hard Handoff for speech and packet data according to the present invention. In the G-CDMA system, there are at least nine scenarios of handoff. For ease of explanation, only one scenario will be illustrated herein as an example. Those skilled in the art will recognize that other handoff scenarios are possible. For further ease in explanation, the handoff procedure will be illustrated in FIGS. 6–8 as follows.

FIG. 6 illustrates the high level flow of a hard handoff 600 according to the present invention. In FIG. 6, the access interface manager is the BSS manager 610 and the Protocol IW manager 612. The inter-system interface manager is the system manager 616. The discussion herein with reference to FIG. 6 will show only the high level flow, with the details provided in FIGS. 7–8.

In FIG. 6, based on the MS 620 reporting that it crossed a network specified threshold for signal strength, the old BSS 622 recommends a hard handoff to one or more cells in the domain of the new BSS 624 and sends a pilot strength measurement signal in step 1 660. Then, Handoff Required and FACDIR2 messages 662 and IS-95 Handoff signaling 664 are sent. The FACDIR2 message is a message which is sent to request a call handoff to a target. In step 2 662, the old BSS 622 sends a Handoff Required Message with CellId List to the MSC 626 to find a target with available resources. Note that the service options are speech and packet data. After IS-95 Handoff signaling 668 and start of GPRS Handoff 670, in step 3 672, the MSC 626 sends a clear command to the old BS 622 indicating the handoff is to be completed. In step 4 674, the old BS 622 sends a clear complete to the old MSC 626 indicating the completion of the handoff.

FIG. 7 illustrates the Handoff Required and FACDIR2 messaging 700 according to the present invention. In FIG. 7, the access interface manager is the BSS manager 710 and the Protocol IW manager 712. The inter-system interface manager is the System manager 716. In the step-by-step illustration of the Handoff Required and FACDIR2 messaging of FIG. 7, the old BSS 722 recommends a hard handoff to one or more cells in the domain of the new BSS 724 in step 1 760 based on the MS 720 reporting that it crossed a network specified threshold for signal strength. The old BSS 722 sends a Handoff Required Message with CellId List to the old MSC 726 to find a target with available resources. The service options are again speech and packet data.

In step 2 762, the MSC 726 of the regular CDMA system sends a FACDIR2 with service options set to speech plus packet data to the System Manager 716 of the G-CDMA system to invoke the G-CDMA to initiate the handoff. In steps 3 764 and 5 768, the System Manger 716 splits the FACDIR2 into two subsequent FACDIR2 messages: one 764 with service option set to send packet data to the Packet HO Manager 728, and the other one 768 with service option set to send speech to the new CDMA MSC 730.

In steps 4 766 and 6 770, upon receipt the FACDIR2 messages, the Packet HO Manager 728 and new CDMA MSC 730 will separately send HO Request messages to the new BSS Manager 710. The message 766 sent by the Packet HO Manager 728 is a newly defined message with a new parameter "following service" set to send speech to inform the new BSS Manager 710 that there will be a speech service option requested for handoff subsequently.

In step 7 722, the new BS S Manager 710 combines the two HO Request Messages 766, 770 into a single HO Request and sends it to new BSS 724. In step 8 774, the new BSS 724 determines that appropriate resources are available and reserves or allocates traffic channel(s) for speech and packet data services, and sends Handoff Request Ack to new BSS Manager 710. In step 9 776 and 11 780, the new BSS Manager 710 again splits the HO Request Ack into two subsequent messages: one 776 to the Packet HO Manager 728 and the other one 780 to the new CDMA MSC 730. In steps 10 778 and 12 782, upon receipt of the HO Request Ack Messages 776, 780, the Packet HO Manager 728 and the new CDMA MSC 730 send facdir2 Messages to the System Manager 716. The HO Request Ack Message 776 and the facdir2 Message 778 sent and received by the Packet HO Manager 728 are newly defined messages which have a new parameter, "following service". In step 13 784, the System Manager 716 combines two facdir2 778, 782 into one facdir2 784 and sends it to the old CDMA MSC 726 to acknowledge FACDIR2 Messages. In step 14 786, upon receipt of the facdir2 Message 784, the old MSC 726 sends a HO Command Message to the old BSS 722 to convey information of the new BSS 724 to the old BSS 722.

FIG. 8 illustrates the start of the GPRS handoff 800 according to the present invention. In FIG. 8, the access interface manager is the BSS manager 810 and the Protocol IW manager 812. The inter-system interface manager is the System manager 816. In the step-by-step illustration of the start of the GPRS handoff 800 of FIG. 8, the new BSS 824 sends an HO Complete Message to the new BSS Manager 810 in step 1 860. In steps 2 862 and 4 866, the new BSS Manager 810 splits the HO Complete Message 860 into two subsequent HO Complete Messages 862, 866 and sends them to the new CDMA MSC 830 and Packet HO Manager 828, separately. In steps 3 864 and 5 868, upon receipt of HO Complete Messages, the new CDMA MSC 830 and Packet HO Manager 828 send a MobileOnChannel Message to the System Manager 816. In step 6 870, the System Manager 816 then combines the two MobileOnChannel Messages 864, 868 into one and sends the combined MobileOnChannel Message 870 to the old CDMA MSC 826 to indicate the handoff has been completed.

In step 7 872, upon receipt of HO Complete Message in step 1 860, the new BSS Manager 810 sends a newly defined Start GPRS HO Message with the MS ID. In step 8 874, if the type of MS ID in step 7 872 is TMSI, the Protocol IW 812 optionally sends a GetIMSI message 874 to the System Manager 816, where GetIMSI is a newly defined message. In step 9 876, the System Manager 816 sends a PARAM-REQ message to the old VLR 840 to inquiry IMSI. In step 10 878, the old VLR 840 returns the IMSI to the System Manager 816 by sending paramreq Message. In step 11 880, the System Manager 816 sends a GetIMSIResponse with the IMSI to Protocol IW 812.

Steps 12.–15 are for the Modified SGSN Routing Area (RA) Update procedures 882, which are not shown. In step 16 890, the Protocol IW 812 sends an Activate PDP Context Request to SGSN 842. In step 17 892, the SGSN 842 sends a Create PDP Context Request Message to the GGSN 844. In step 18 894, the GGSN 844 sends a Create PDP Context Response Message to the SGSN 842. Finally, in step 19 896, the SGSN 842 sends Activate PDP Context Accept to Protocol IW 812.

In summary, the present invention describes an overlay approach to support the implementation of GPRS functionality to an existing network, such as an IS-95 network, without any changes in the existing exchanges. The implementation relies on interface managers implemented between the MSC and the BSS (BSS interface manager), and between the MSC and network side, i.e. other MSCs and the signaling network, wherein this is called the inter-system interface manager. The SGSN of the GPRS network is installed parallel to the MSC, thus having direct interfaces to both interface managers.

The present invention provides an interface that not only has the functionality of protocol conversion, but also some split and combine functionality for messages having significance for both the SGSN and the MSC. As an example, a handover for both packet and circuit switched connections is seen as one procedure in the BSS and in the inter-MSC network. According to the present invention, messages are split in the interface manager to continue the procedure as two separate processes, packet HO in the SGSN and circuit switched HO in the MSC. Thus, the MSC sees the procedure as circuit switched only HO, and the SGSN as a packet only HO.

In addition to the architecture and the splitting combining functionality of the interface managers, the present invention provides an authentication procedure for SGSN, which is performed by triggering a Location Update (LU) in MSC; and as a part of this procedure, the MSC authenticates the MS wherein a successful LU implies successful authentication. TMSI allocation is done by the MSC and the TMSI send by the BSS interface manager to the SGSN. Information about routing areas needed by the SGSNs (e.g., in inter SGSN routing area updates) is generated by the BSS interface manager, and in the existing air interface the routing area information is not transmitted.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An overlay system provided over a first infrastructure in a communications system, comprising:
   an access network,
   a terminal connected to the access network,
   a first infrastructure for providing processing of first set of communication services;
   a second infrastructure for providing-processing of second set of communication services;
   a first interface manager, coupled to the first infrastructure and the second infrastructure, for providing an access interface to an access system and routing access system signaling based upon a type of service associated with the received signaling from an access network subsystem either to the first or the second infrastructure; and
   a second interface manager, coupled to the first infrastructure and the second infrastructure, for providing an inter-system interface to a signaling network and processing inter-system signaling between the signaling network and the first and second infrastructures.

2. The overlay system of claim 1, wherein the first interface manager is adapted to monitor the signaling between the access network and the second infrastructure, and to trigger a function in the first infrastructure on the basis of the signaling between the access network and the second infrastructure.

3. The overlay system of claim 2, wherein the signaling between the access network and the second infrastructure triggers a security procedure in the first infrastructure.

4. The overlay system of claim 3, wherein the security procedure is an authentication procedure.

5. The overlay system of claim 3, wherein the security procedure is the selection of encryption keys in the access network, and the selected encryption keys are used for the services provided by the second infrastructure.

6. The overlay system of claim 1, wherein the first infrastructure is a circuit switched infrastructure such as an infrastructure according to the IS-95 standard.

7. The overlay system of claim 1, wherein the second infrastructure is a packet switched infrastructure such as an infrastructure according to the GPRS standard.

8. The overlay system of claim 1, wherein the first interface manager comprises an access interface manager, the access interface manager outputting access interface signaling based on access system signaling received from the access system according to a type of service associated with the received access system signaling.

9. The overlay system of claim 8, wherein the access interface manager further comprises a base station subsystem manager and a protocol interworking manager.

10. The overlay system of claim 9, wherein the second interface manager further comprises an inter-system interface manager.

11. The overlay system of claim 10, wherein the second infrastructure further comprises a general packet radio service system including a packet handoff manager and a serving general packet radio service support node.

12. The overlay system of claim 11, wherein the second infrastructure further comprises a gateway general packet radio service support node coupled to the serving general packet radio service support node.

13. The overlay system of claim 12, wherein the inter-system signaling comprises access interface signaling for the access interface manager, second signaling for the second infrastructure, first signaling for the first infrastructure, and signaling network signaling for the signaling network.

14. The overlay system of claim 13, wherein first infrastructure comprises a mobile switching center and a visitor location register.

15. The overlay system of claim 9, wherein the first infrastructure further comprises a home location register coupled to the second interface manager.

16. The overlay system of claim 15, wherein the home location register provides administrative information and the current location of each registered subscriber accessing the existing switching infrastructure in the network.

17. The overlay system of claim 1, wherein the received signaling comprises registration signal flows, mobile origination call flows and hard handoff signal flows.

18. The overlay system of claim 1, wherein the first interface manager further comprises a base station subsystem manager and a protocol interworking manager.

19. The overlay system of claim 1, wherein the second interface manager further comprises an inter-system interface manager.

20. The overlay system of claim 1, wherein the second infrastructure further comprises a general packet radio service system including a packet handoff manager and a serving general packet radio service support node.

21. The overlay system of claim 20, wherein the second infrastructure further comprises a gateway general packet radio service support node coupled to the serving general packet radio service support node.

22. The overlay system of claim 1, wherein the inter-system signaling comprises access interface signaling for the access interface manager, second signaling for the second infrastructure, first signaling for the first infrastructure, and signaling network signaling for the signaling network.

23. The overlay system of claim 1, wherein the first infrastructure comprises a mobile switching center and a visitor location register.

24. The overlay system of claim 23, wherein the first infrastructure further comprises a home location register coupled to the second interface manager.

25. The overlay system of claim 24, wherein the home location register provides administrative information and the current location of each registered subscriber accessing the first infrastructure in the network.

* * * * *